H. H. ANGELL.
APPARATUS FOR UNLOADING AND MOWING HAY.
No. 28,822. Patented June 26, 1860.
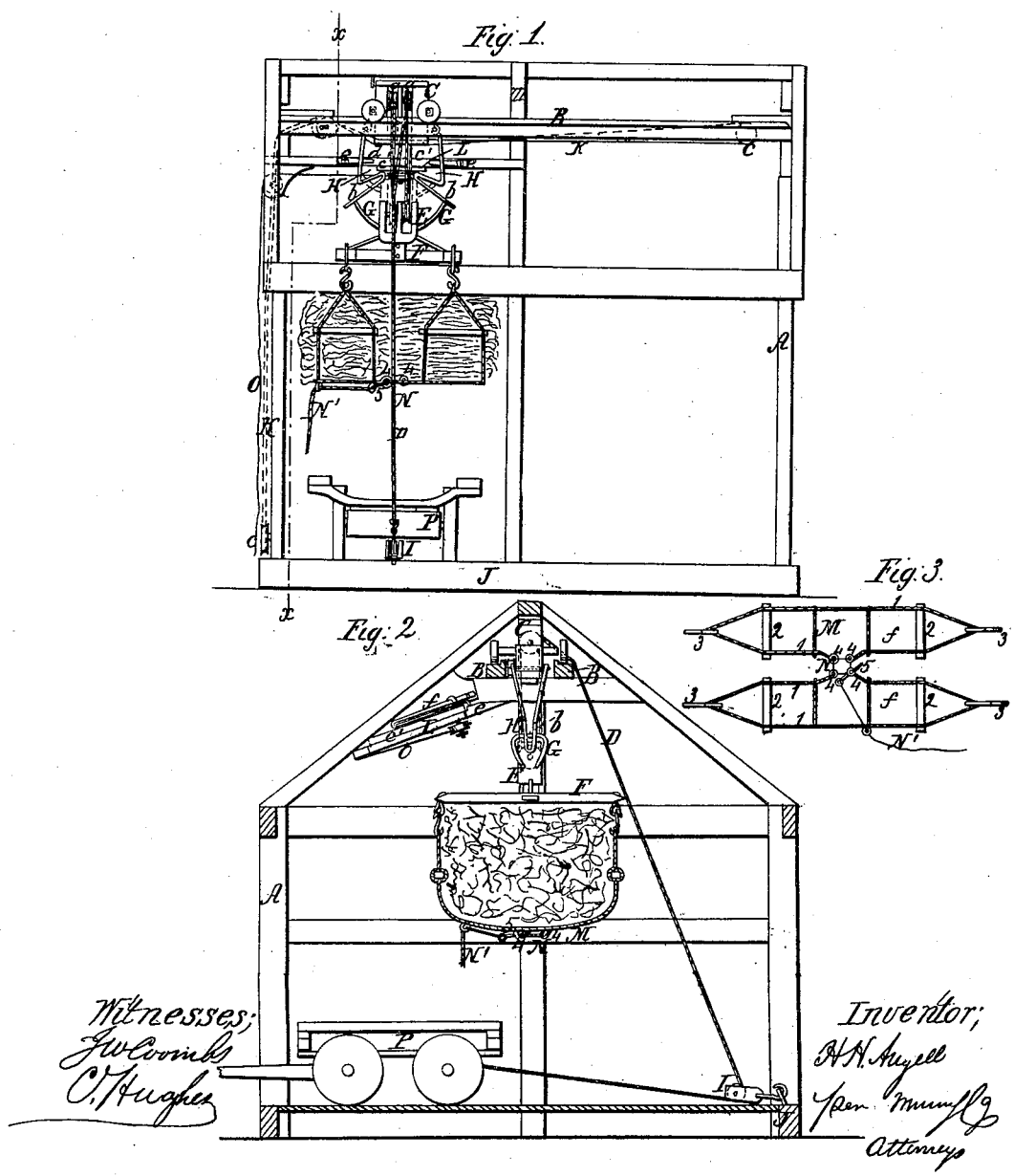

UNITED STATES PATENT OFFICE.

H. H. ANGELL, OF CLERMONT, IOWA.

UNLOADING HAY.

Specification of Letters Patent No. 28,822, dated June 26, 1860.

*To all whom it may concern:*

Be it known that I, H. H. ANGELL, of Clermont, in the county of Fayette and State of Iowa, have invented a new and Improved Apparatus for Unloading and Mowing Hay; and I do hereby declare that the following is a full, clear, and exact description of the same, reference being had to the annexed drawings, making a part of this specification, in which—

Figure 1 is a sectional elevation of a barn with my invention applied to it. Fig. 2 is also a sectional view of ditto, the plane of section being at right angles to that of Fig. 1. Fig. 3 is a detached view of the rope mechanism by which the load is suspended to the tackle.

Similar letters of reference indicate corresponding parts in the several figures.

This invention has for its object the facilitating of the unloading of hay and other crops from carts or wagons direct from the field, and mowing the same as it is unloaded.

The invention consists in the employment or use of a carriage placed on suitable ways within the barn at its peak, said carriage having a tackle connected with it and a catch or fastening; the above parts being used in connection with a detaching device and all arranged substantially as hereinafter described to effect the desired end.

To enable those skilled in the art to fully understand and construct my invention I will proceed to describe it.

A represents the frame of a barn, and B, B, are two parallel ways placed in the peak, and having a carriage C, on them, the carriage being allowed to move freely back and forth on the ways. In this carriage C, shieves $a$, are placed, through which a tackle rope D passes, said rope also passing through a shieve or block E, which is attached to a frame F. The block E, has a curved or bow-shaped rod G, at two opposite sides of it, said rods being inclined outward and upward at angles of about 45°, as shown in Fig. 1.

To the carriage C, there are suspended two catches or hooks H, H, said catches or hooks being at opposite sides of the carriage and suspended loosely from it. The lower part of each hook has an oblique or inclined terminal $b$, as shown clearly in Fig. 1.

The tackle rope D, passes through a stationary block I, connected to a sill J, of the barn, and the carriage has a rope K, connected to it, which rope passes around pulleys $c$, in the frame of the barn, as shown in Fig. 1.

To one side of the roof of the barn there is attached a slide bar L. This bar is fitted between suitable guides $c'$, $c'$, and to its upper end there is secured a traverse bar $d$, which has a taper or beveled projection $e$, at each end. To the traverse bar $d$, a spring $f$, is connected, said spring having a tendency to keep the bar L, down between its guides $c'$, and the projections $e$, back from the hooks H, H, of the carriage C, when the latter is in line with bar L.

M represents the rope mechanism which encompasses the load to be elevated or mowed. This is formed of two parts $f$, $f$, each part having two parallel ropes 1, 1, connected by traverse bars 2, 2. The ends of each part $f$, have hooks 3, attached, and the two parts $f$, $f$, are connected by a rope N, which is attached to one of the parts $f$, and passes through eyes 4, placed at about the centers of the adjoining sides of the parts $f$; said rope N, having a loop at its outer end, through which a pin 5, at the end of a rope N', passes, as shown clearly in Fig. 3.

O, is a rope which is attached to the lower end of the bar L, and passing around a pulley $g$, attached to the roof near the upper end of said bar passes down by the side of the frame A, as shown in Fig. 1.

The operation is as follows: The rope mechanism M, is laid on the bottom of the cart or wagon P, and the wagon or cart is loaded up in the field, as usual. The loaded wagon or cart is driven into the barn, and the carriage C, is moved by actuating the rope O, so that it will be brought directly over the load, and the frame F, is lowered sufficiently to allow the hooks 3, of the rope mechanism to be attached to the ends of the frame F. The end of rope D, is then attached to the wagon or cart and the latter driven forward, the rope D, elevating the load, which ascends until the rods G, catch over the hooks H, of the carriage C, the rods G, as they ascend spreading the hooks in consequence of the former striking against the inclined terminals $b$. When the load is suspended on the hooks H, H, an operator actuates the rope K, and moves the carriage C, along on the ways B, B, the wagon or cart being gradually backed, or the rope D, detached therefrom and held by an attendant; and when the load arrives over the spot where it is to be deposited, the operator then pulls the rope N', and withdraws the pin 5, and the two parts $f, f$, of the rope mechanism M, are disconnected thereby allowing the load to be discharged. The operator then again actuates the rope K, and moves the carriage back to its original position over the spot where the load and wagon or cart originally were, the frame F, being left suspended to the hooks H. The rope D, is then detached from the wagon or cart, and when the latter is again driven with its load underneath the carriage C, the operator actuates the rope O, and thereby shoves upward the bar L, and causes the projections $e, e$, to throw outward the hooks H, H, and release the frame F, which descends, and from which the rope mechanism M, previously used is detached, and the one underneath the load attached to the frame, and the operation previously described is repeated.

By lowering the frame F, previous to the re-loading of the wagon or cart, one rope mechanism may be made to answer.

Having thus described my invention what I claim as new, and desire to secure by Letters Patent, is—

The employment or use of the carriage C, fitted on the ways B, B, provided with a tackle, frame F, and hooks H, H, and used in connection with the rope mechanism M, and the hook separator, formed of the bars L, $d$, and beveled projections $e$, or their equivalents; all being arranged and applied substantially as and for the purpose set forth.

H. H. ANGELL.

Witnesses:
   JOHN P. CALVIN,
   B. E. AGARD.